United States Patent
Elder et al.

(10) Patent No.: US 10,326,690 B2
(45) Date of Patent: Jun. 18, 2019

(54) OPERATING A NETWORK NODE CONFIGURED AS PART OF A LINK AGGREGATION SYSTEM

(71) Applicant: Metaswitch Networks Ltd, Enfield (GB)

(72) Inventors: Alan Elder, Enfield (GB); Jonathan Harrison, Enfield (GB); Gawain Bosworth, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 95 days.

(21) Appl. No.: 14/869,661

(22) Filed: Sep. 29, 2015

(65) Prior Publication Data

US 2016/0094436 A1 Mar. 31, 2016

(30) Foreign Application Priority Data

Sep. 29, 2014 (GB) .................................. 1417149.0

(51) Int. Cl.
*H04L 12/709* (2013.01)
*H04L 29/06* (2006.01)
(Continued)

(52) U.S. Cl.
CPC ............ *H04L 45/245* (2013.01); *H04L 45/28* (2013.01); *H04L 47/805* (2013.01); *H04L 69/14* (2013.01); *Y02D 50/30* (2018.01)

(58) Field of Classification Search
CPC ....... H04L 45/245; H04L 45/28; H04L 69/14; H04L 47/805; Y02B 60/33
See application file for complete search history.

(56) References Cited

U.S. PATENT DOCUMENTS

| 8,724,456 B1* | 5/2014 | Hong ................... G06F 11/00 370/225 |
| 2004/0213148 A1* | 10/2004 | Willhite ................. H04L 45/00 370/225 |

(Continued)

OTHER PUBLICATIONS

Martine et al., IETF RFC:7275 Inter-Chassis Communication Protocol for Layer 2 Virtual Private Network (L2VPN) Provider Edge (PE) Redundancy, Internet Engineering Task Force, Jun. 2014. See in particular Section 3.1.
(Continued)

*Primary Examiner* — Alex Skripnikov
*Assistant Examiner* — Sharmin Chowdhury
(74) *Attorney, Agent, or Firm* — EIP US LLP (57) ABSTRACT

A system and method of operating a network node configured as part of a link aggregation system. The system includes a plurality of first network nodes and a plurality of second network nodes for providing connectivity to first and second networks respectively, and a plurality of links between the first network nodes and the second network nodes. The network node is configured as one of the first network nodes.
The network node may be set in one of an active operation mode and a standby operation mode based at least in part on a comparison of a priority with one or more received priorities. The priority may be based on connectivity to an active second network node or links available for selection. The network node may determine that it is isolated from the first network and indicate that isolation in control messages sent to second network nodes.

16 Claims, 5 Drawing Sheets

(51) Int. Cl.
*H04L 12/703* (2013.01)
*H04L 12/927* (2013.01)

(56) References Cited

U.S. PATENT DOCUMENTS

| | | | |
|---|---|---|---|
| 2010/0020680 A1* | 1/2010 | Salam | H04L 43/0811 370/225 |
| 2011/0075554 A1* | 3/2011 | Holness | H04L 1/22 370/228 |
| 2012/0106322 A1* | 5/2012 | Gero | H04L 12/437 370/225 |
| 2012/0113835 A1 | 5/2012 | Alon et al. | |
| 2013/0229912 A1* | 9/2013 | Yu | H04L 41/0663 370/228 |
| 2013/0235876 A1* | 9/2013 | Sajassi | H04L 41/12 370/401 |
| 2013/0246635 A1 | 9/2013 | Gero et al. | |
| 2013/0301404 A1 | 11/2013 | Kano | |
| 2014/0050092 A1* | 2/2014 | Fan | H04L 12/12 370/235 |
| 2014/0115189 A1* | 4/2014 | Ao | H04L 45/245 709/250 |

OTHER PUBLICATIONS

IEEE 802.1AX-2008, IEEE Standard for Local and metropolitan area networks Link Aggregation, IEEE, New York, Nov. 3, 2008. See in particular Annex B.

* cited by examiner

OPERATING A NETWORK NODE CONFIGURED AS PART OF A LINK AGGREGATION SYSTEM

CROSS-REFERENCE TO RELATED APPLICATIONS

This application claims priority under 35 U.S.C. § 119(a) to United Kingdom patent application no. 1417149.0, filed on Sep. 29, 2014, the entire content of which is hereby incorporated by reference.

BACKGROUND OF THE INVENTION

Field of the Invention

The present invention relates to multi-chassis link aggregation.

Description of the Related Technology

It is desirable to provide redundancy and protection against failure in network nodes which interconnect two networks. Link Aggregation (LAG) was originally designed to operate between two devices having multiple links between them. LAG allows the two devices to treat the multiple links as if they were one link, termed a bundle. This provides improved bandwidth (when more than one link is selected in the bundle) and/or protection against link failure within the bundle (when one or more links are selected in the bundle and others are standby).

LAG does not specifically address the situation where multiple links between more than two devices could be selected to provide interconnection between two networks. For example a device providing connectivity to one network could be multi-homed to two or more devices in another network. This is particularly beneficial when redundancy and failure protection is desired because it can provide protection against device failure and isolation of a device from its connected network in addition to link failure. The operation of multi-chassis link aggregation (MC-LAG) to provide redundancy and failover protection has been proposed to provide 1:N protection; a single node on one side (for example a customer side) has physical connections to several nodes on the other side (for example a provider side).

A first known system provides link aggregation and operation of a relay network comprising four interconnected boundary nodes, two on each side. Each side of the relay network is connected to a single communication node through Link Aggregation. Messages are exchanged between nodes in the relay network using Advanced Protection Switching (APS) format. The boundary nodes operate to select a network path within the relay. To connect the communication node at each end to the correct boundary node selected by the relay network, multi-chassis link aggregation is used between each communication node and its respective boundary group, which is the two nodes of the relay network with connections to the communication node.

A second known system provides a "2×2 attached" interconnected zone which connects two packet networks. The zone includes two nodes on each side with network connections to the two nodes on the other side. On one side a node is designated as the "master" and the other node as the "deputy". The two nodes on the other side are both designated as "slave" nodes. In operation the master selects which of its interfaces is used for network traffic between the two packet networks. On the other side, the slave nodes follow the master's decision. If the master node fails, the deputy node acts as the substitute for the master node.

Both these systems have limited interoperability with other equipment because all four nodes must operate according to the system. It is complicated to extend the systems to more than four nodes.

SUMMARY

In a first exemplary embodiment, there is provided a method of operating a network node configured as part of a link aggregation system, the link aggregation system comprising a plurality of first network nodes for providing connectivity to a first network, a plurality of second network nodes for providing connectivity to a second network, and a plurality of links between the first network nodes and the second network nodes, wherein the network node is configured as one of the first network nodes and the method comprises:

sending link aggregation control messages to other network nodes in the link aggregation system;

receiving link aggregation control messages from the other network nodes in the link aggregation system;

determining an active second network node from the received link aggregation control messages;

determining a priority based at least in part on connectivity of the network node to the active second network node; and setting the network node in one of an active operation mode and a standby operation mode for the link aggregation system based at least in part on a comparison of the priority with one or more received priorities from the received link aggregation control messages, the one or more received priorities based at least in part on connectivity of others of the first network nodes to the active second network node.

In a second exemplary embodiment, there is provided a method of operating a network node configured as part of a link aggregation system, the link aggregation system comprising a plurality of first network nodes for providing connectivity to a first network, one or more second network nodes for providing connectivity to a second network, and a plurality of links between the first network nodes and the second network nodes, wherein the network node is configured as one of the first network nodes and the method comprises:

receiving link aggregation control messages from other network nodes in the link aggregation system;

determining from the received link aggregation control messages, whether the network node has any links which are available for selection;

determining a priority based at least in part on any links which are available for selection; and setting the network node in one of an active operation mode and a standby operation mode for the link aggregation system based at least in part on a comparison of the priority with one or more received priorities from the received link aggregation control messages, the one or more received priorities based at least in part on links available for selection by others of the first network nodes.

In a third exemplary embodiment, there is provided a method of operating a network node configured as part of a link aggregation system, the link aggregation system comprising a plurality of first network nodes for providing connectivity to a first network, one or more second network nodes for providing connectivity to a second network, and a plurality of links between the first network nodes and the second network nodes, wherein the network node is configured as one of the first network nodes and the method comprises:

sending link aggregation control messages to other network nodes in the link aggregation system;

receiving link aggregation control messages from the other network nodes in the link aggregation system;

determining whether the network node is isolated from the first network; and responsive to a determination that the network node is isolated from the first network, indicating that the network node is isolated in link aggregation control messages sent by the network node to the second network nodes.

In a fourth exemplary embodiment, there is provided a system for use in a network node, the network node for configuration as part of a link aggregation system, the link aggregation system comprising a plurality of first network nodes for providing connectivity to a first network and a plurality of second network nodes for providing connectivity to a second network, wherein the network node is for configuration as one of the first network nodes and the system comprises:

a first network interface for connection to the first network; and at least two second network interfaces for connection to respective second network nodes;

at least one memory including computer program code; and at least one processor in data communication with the at least one memory, wherein the at least one processor is configured to:

send link aggregation control messages to other network nodes in the link aggregation system;

receive link aggregation control messages from the other network nodes in the link aggregation system;

determine an active second network node from the received link aggregation control messages;

determine a priority based at least in part on connectivity of the network node to the active second network node; and set the network node in one of an active operation mode and a standby operation mode for the link aggregation system based at least in part on a comparison of the priority with one or more received priorities from the received link aggregation control messages, the one or more received priorities based at least in part on connectivity of others of the first network nodes to the active second network node.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

According to an embodiment of the present invention, there is provided a method of operating a network node configured as part of a link aggregation system. The link aggregation system comprises a plurality of first network nodes for providing connectivity to a first network, a plurality of second network nodes for providing connectivity to a second network, and a plurality of links between the first network nodes and the second network nodes. The network node is configured as one of the first network nodes and the method comprises:

sending link aggregation control messages to other network nodes in the link aggregation system;

receiving link aggregation control messages from the other network nodes in the link aggregation system;

determining an active second network node from the received link aggregation control messages;

determining a priority based at least in part on connectivity of the network node to the active second network node; and setting the network node in one of an active operation mode and a standby operation mode for the link aggregation system based at least in part on a comparison of the priority with one or more received priorities from the received link aggregation control messages, the one or more received priorities based at least in part on connectivity of others of the first network nodes to the active second network node.

Where "based at least in part on" is used throughout this specification it includes the possibility of other factors being considered as well as the stated factor, or only the stated factor being considered.

When a network node within a link aggregation system is operated according to this method, the operation is altered from the prior art so that the active second network node is determined and the setting of the network node in active or standby mode is based at least in part on a priority which is based at least in part on the connectivity of the network node to the active second network node. In prior art systems, the network node would either have its operation state determined by the active second network node, or determine its operation independently of which second network node is active. A network node operating according to the method of this embodiment can avoid an active first network node being chosen which has no connectivity to the active second network node (which could happen when both sides operate independently).

Where a plurality of first network nodes and a plurality of second network nodes are referred to, there is no requirement for the number of first network nodes to be the same as the number of second network nodes. For example, there may be more or fewer first network nodes than there are second network nodes. The reference to a plurality covers any number of nodes providing that there at least two.

The memory can be anything suitable for storing computer-executable instructions, for example, RAM, ROM, Flash memory, mechanical disks, and hybrid drives comprising both flash memory and a mechanical disk, all in both removable and non-removable forms. The first network and the second network can be any two networks which are desired to be connected with protection against failure, for example they may be packet networks including IP and MPLS networks. In some embodiments, the first network is a customer network and the second network is a provider network. The first and second network nodes can also be referred to as network devices, routers, switches and edge devices. For example, the first network nodes may be customer edge devices and the second network nodes may be provider edge devices.

The active and standby operation modes for the link aggregation system refer to the role of the network node in the aggregated link. For example, standby operation mode does not mean that the network node is completely in standby, only that it is standby for the link aggregation system. In the active operation mode the network node is involved in the forwarding of data from the first network to the second network. In the standby operation mode the network node does not forward packets from the first network to the second network for that link aggregation group but may still provide other services and operations to the first network. A single network node may be configured as part of two or more link aggregation systems and may have different operation states for each of those systems. For example a single network node may be active for one link aggregation system and in standby for another.

The active second network node can be determined using synchronization data in a received link aggregation control message from the active second network node. The synchronization data can be sent in any suitable form, for example, in MC-LAG as defined in RFC 7275, the synchronization data may be synchronization data encoded in an Actor State variable of a Link Aggregation Control Protocol Data Unit (LACPDU) sent using Link Aggregation Control Protocol (LACP) as defined in clause 5.4.2.2 of IEEE 802.1AX-2008. An LACPDU contains an Actor_state field with a Synchronization bit. This bit will be set to TRUE (encoded as 1) to indicate a link that is IN_SYNC, and only the active second node will have links which are IN_SYNC. Although this field and the data is known, its interpretation is new in this embodiment because links to the active second network node, as represented by the IN_SYNC status, are considered when determining the operation status of the first network node. In the prior art, such as conventional MC-LAG as defined in RFC 7275, the selection of an active node on each side operated independently from the other, by the exchange of multichassis Link Aggregation Control Protocol (mLACP) control messages within that side. This is also backwards compatible with normal operation of mLACP on the second side, allowing the benefit to be obtained by only applying it on the first side.

The network node can be set in the active operation mode when the network node has the highest priority of the first network nodes. Otherwise, the network node may be set in the standby operation mode. Higher priority is used to refer to a logical conclusion and is not limited to numerically higher, for example a numerically lower value may equate to a higher priority. Priority can be determined in any suitable way, for example it can be determined using standard mLACP algorithms used to select a node, but altered not to consider (or discount) second network nodes in standby (or not active).

In some embodiments, the method can further comprise determining whether the network node is isolated from the first network; and, responsive to a determination that the network node is isolated from the first network, indicating that the node is isolated in link aggregation control messages sent by the network node to the second network nodes. In this case, the first network node can signal to the second network nodes that it is isolated and can therefore have some influence on the decision of the active second network node.

The indicating that the node is isolated may use the existing Aggregation data defined in the Actor_State field in the LACPDU, as defined in clause 5.4.2.2 of IEEE 802.1AX-2008. As currently used, this field is configured to indicate potential candidates for aggregation. If its value is TRUE, the link is a potential candidate for aggregation, if its value is FALSE, the link can only be operated as an individual link. Prior to this embodiment, aggregation data in this field was not used to signal isolation or adjusted during operation. In this embodiment it allows the network node to influence the decision of the active second network node because the second network nodes will not consider links to the network node when the flag is reset or FALSE. Thus, the decision of active second network node takes into account connectivity only to first network nodes which are not isolated. In addition, the second network nodes may run the standard MC-LAG as defined in RFC 7275, so that a change to the use of this data and the way it is set and reset may only take place on the first network nodes or on both the first network nodes and the second network nodes.

The indication of isolation in control messages can also be used in embodiments independently of features relating to the operation mode of the network node. Accordingly, in another embodiment, there is provided a method of operating a network node configured as part of a link aggregation system. The link aggregation system comprises a plurality of first network nodes for providing connectivity to a first network, one or more second network nodes for providing connectivity to a second network, and a plurality of links between the first network nodes and the second network nodes. The network node is configured as one of the first network nodes and the method comprises:

sending link aggregation control messages to other network nodes in the link aggregation system;

receiving link aggregation control messages from the other network nodes in the link aggregation system;

determining whether the network node is isolated from the first network; and responsive to a determination that the network node is isolated from the first network, indicating that the network node is isolated in link aggregation control messages sent by the network node to the second network nodes.

This embodiment allows the same benefits regarding aggregation data and influence on the decision of an active second network node to be obtained.

In the some embodiments, the method can further comprise, responsive to a determination that the network node is not isolated from the first network, indicating that the network node is not isolated in link aggregation control messages sent by the network node. When the link aggregation control messages are sent according to IEEE 802.1AX-2008, this can involve setting the Aggregation variable in the Actor State field of an LACPDU. This allows the aggregation data to reflect the status of connection of the network node to the first network.

In some embodiments, the method comprises changing dynamically the indication that the network node is isolated or is not isolated during operation of the network node. This provides a simple method to indicate up-to-date status of the connection of the network node to the first network to the other network nodes in the second group.

As discussed so far, the method modifies the operation of a network node on one side of a link aggregation system. To use one terminology, the first network nodes are a secondary, or slave group and the second network nodes are a primary, or master group. When the network node is used more generally, it could be deployed in either a master or a slave group. Accordingly, in another embodiment, there is provided a method of operating a network node configured as part of a link aggregation system with other network nodes. The link aggregation system comprises a plurality of first network nodes providing for connectivity to a first network, a plurality of second network nodes for providing connectivity to a second network, and a plurality of links between the first network nodes and the second network nodes. The network node is a first network node and the method comprises:

determining whether the network node is part of a slave group or a master group; and responsive to a determination that the network node is part of the slave group, operating the network node according to any of the embodiments above, with or without other features also described.

The determining whether the network node is part of a slave group or a master group can be based at least in part on a system priority of the network node and system priorities of the other network nodes. The system priority can be as defined in MC-LAG according to RFC-7275. For the network node itself it can be set in any known way, for example it may be defined in a network configuration file at a chassis or link aggregation level. System priorities for other network nodes can be received in control messages. In one embodiment, the group with the highest system priority is the master group and the group with the lower system priority is the slave group. In another embodiment the group with the highest system priority is the slave group and the group with the lower system priority the master group. In another embodiment, when the system priority of the first group and second group is the same, the master group may be the group which contains a network interface with the lowest or highest network address, for example the lowest or highest MAC address. The system priority data can be the same for each network node in the first group and the same for each network node in the second group. Alternatively, the system priority for each side can be determined based at least in part on a sum or average of the individual priorities on that side.

The operation regarding the indication of isolation in control messages is also beneficial when the network node on is on the master side. In some embodiments, responsive to a determination that the first group is the master group, the network node is operated to include only the modification to setting and resetting isolation data in control messages as discussed above.

In all the above embodiments, the control messages can be mLACP messages as defined in RFC 7275 when communicating between nodes in the first group and LACP messages as defined in IEEE 802.1AX-2008 when communicating with nodes in the second group to benefit compatibility and interoperability.

So far, the embodiments have been applied to a method of operating a network node. Other embodiments apply these methods to a network node itself. In another embodiment a network node is configured or for configuration as part of a link aggregation system. The link aggregation system comprises a plurality of first network nodes providing connectivity to a first network and a plurality of second network nodes providing connectivity to a second network. The network node is configured or for configuration as one of the first network nodes and comprises:

a first network interface for connection or communicably connected to the first network;

at least two second network interfaces for connection or communicably connected to respective second network nodes;

memory storing computer-executable instructions; and a processor.

The computer-executable instructions are executable by the processor to cause the network node to operate according to the methods of one or more of the embodiments discussed above.

Where the network interfaces are referred to as "for connection" or "communicably connected" the connection can be by a physical or a virtual link and nodes may be directly or indirectly connected.

The network node can be an edge device. Edge devices can be positioned at the edge of a network to provide connectivity to a second network. For example, they may provide a point of access to the second network.

In some embodiments there are at least the same number of second network interfaces as there are second network nodes, wherein all of the network nodes in the second group are communicably connected to the network node through respective second network interfaces. This provides maximum redundancy. In other embodiments there may not be a second network interface connected to each node in the second group, however such an embodiment will have lower redundancy than one in which a connection is provided to all nodes in the second group.

In another embodiment, a link aggregation system comprises a plurality of first network nodes providing connectivity to a first network, a plurality of second network nodes providing connectivity to a second network; and a plurality of links between the first network nodes and the second network nodes. Each of the first network nodes are network nodes which operate according to one of the embodiments above. The link aggregation system is configured to select one of the plurality of links for communications between the first network and the second network. Such a system can obtain the benefits of improved protection against one of the first network nodes becoming isolated. The plurality of second network nodes can be configured to operate in an RFC 7275 (June 2014) system.

In another embodiment, a link aggregation system comprises a plurality of first network nodes providing connectivity to a first network, a plurality of second network nodes providing connectivity to a second network, and a plurality of links between the first network nodes and the second network nodes. Each of the first network nodes and each of the second network nodes are network nodes as discussed above which determine whether they are part of a master group and a slave group and change their operation accordingly. The first network nodes are configured as a slave group and the second network nodes as a master group.

Further embodiments provide a computer-readable medium having computer-executable instructions embodied thereon that, when executed by a processor of a network node, cause the network node to operate according to the method of any of the embodiments discussed above.

In another embodiment, there is provided a network node for use in a link aggregation system, the link aggregation system comprising a first group of at least two network nodes for providing connectivity to a first network and a second group of at least two network nodes for providing connectivity to a second network. The network node is configured or for configuration as part of the first group and comprises: a first network interface for connection or communicably connected to the first network; at least two second network interfaces for connection or communicably connected to respective network nodes in the second group; memory comprising computer-executable instructions; and a processor. The computer-executable instructions are executable by the processor to cause the network node to:

exchange link aggregation control messages with the network nodes in the first group and second group, determine whether the first group is a master group or a slave group based at least in part on received link aggregation control messages;

if it is determined that the first group is the master group, set the network node in an active aggregation operation mode for the link aggregation group if the network node has a higher priority than the other network nodes in the first group, and otherwise set the network node in a standby aggregation operation mode; and if it is determined that the first group is the slave group, set the network node in active aggregation operation mode if the network node has a higher priority for connection to an active network node in the second group than the other network nodes in the first group, and otherwise set the network node in a standby aggregation operation mode.

According to another embodiment, there is provided a method of operating a network node configured as part of a link aggregation system. The link aggregation system comprises a plurality of first network nodes for providing connectivity to a first network, one or more second network nodes for providing connectivity to a second network, and a plurality of links between the first network nodes and the second network nodes. The network node is configured as one of the first network nodes and the method comprises:

receiving link aggregation control messages from other network nodes in the link aggregation system;

determining from the received link aggregation control messages, whether the network node has any links which are available for selection;

determining a priority based at least in part on any links which are indicated as available for selection; and setting the network node in one of an active operation mode and a standby operation mode for the link aggregation system based at least in part on a comparison of the priority with one or more received priorities from the received link aggregation control messages, the one or more received priorities based at least in part on links available for selection by others of the first network nodes.

This can improve the operation of the link aggregation group when the first network group is part of a 1:N link aggregation group or an N:M link aggregation group. The received link aggregation control messages can be LACP messages from the one or more second nodes and/or mLACP messages from the others of the first network nodes. Links available for selection are then indicated by the IN_SYNC flag being set. Links that are not available for selection may not be considered when determining the priority, or may be given a lower weighting than links that are available for selection.

Other embodiments may apply this method to the network node itself or a computer program and it can be combined with features of one or more embodiments discussed above.

To provide redundancy and failover protection, MC-LAG operates to select one of the nodes on the provider side to be the active node. Only links to the active node are used to forward traffic. The other nodes on the provider side are standby, ready for use should the active node on the provider side fail. This configuration is therefore termed "active-standby". Several different vendors provide equipment implementing proprietary versions of multi-chassis link aggregation.

Figure 1:
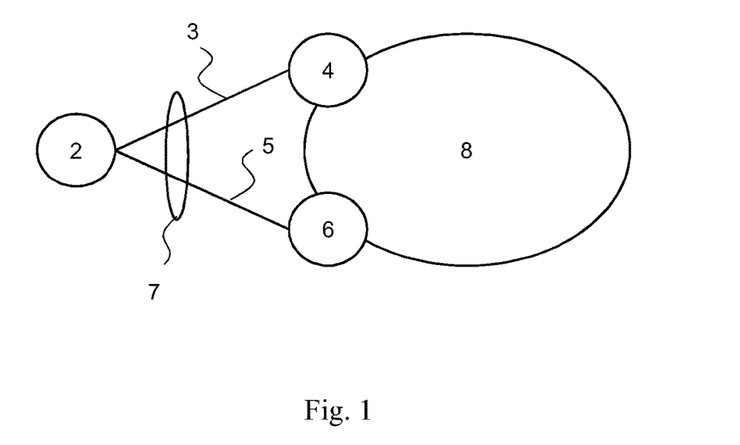
FIG. 1 shows a diagrammatic representation of a 1:2 multi-chassis link aggregation system.

A 1:2 implementation of MC-LAG according to RFC 7275 provides a single node on the customer side and two nodes on the provider side. An example of such an implementation is depicted in FIG. 1. Customer node 2 is connected by links 3 and 5 to two provider nodes 4 and 6. Together these are configured as a link aggregation group 7. The provider nodes 4 and 6 provide connection to a core network 8. When operated according to RFC-7275, the system exchanges multichassis Link Aggregation Control Protocol (mLACP) messages defined by RFC 7275 and Link Aggregation Control Protocol (LACP) messages defined by IEEE-802.1AX-2008 to control the selection of the active link. mLACP messages are exchanged where there are multiple nodes on one side, in this case between nodes 4 and 6. mLACP operates to synchronize data between the nodes on the same side and select an active node on that side. LACP operates between the two sides of the system to communicate the selected node to the other side. Such a system can provide protection against failure of a node 4, 6 on the provider side, physical failure of one of the links 3, 5 between the customer and provider sides, and isolation of a provider node 4, 6 from its core network 8. However, this implementation cannot protect against failure of the node on the customer side, nor can it protect against the node on the customer side becoming isolated from its core network.

According to an embodiment, a multi-chassis link aggregation system has at least two nodes on both sides. Nodes on one side are considered to be a primary, or master, group and nodes on the other side are considered to be a secondary, or slave, group. The slave group selects one active slave node based at least in part on an active master node in the master group. The slave group operates differently from the prior art in that the active master node is considered when selecting the active slave node; the slave group does not operate completely independently from the master group, for example as is the case when RFC 7275 is applied to systems with multiple nodes on both sides. For example, slave nodes that are not connected to the active master node are not considered when selecting the active slave node. As a further benefit, the system can be implemented by only changing operation from standardized MC-LAG according to RFC 7275 on the slave side, and without requiring any change in the content of the LACPDUs (control messages) exchanged between the slave and master sides under IEEE 802.1AX-2008, allowing interoperability with nodes operating according to RFC 7275 on the master side.

Figure 2:
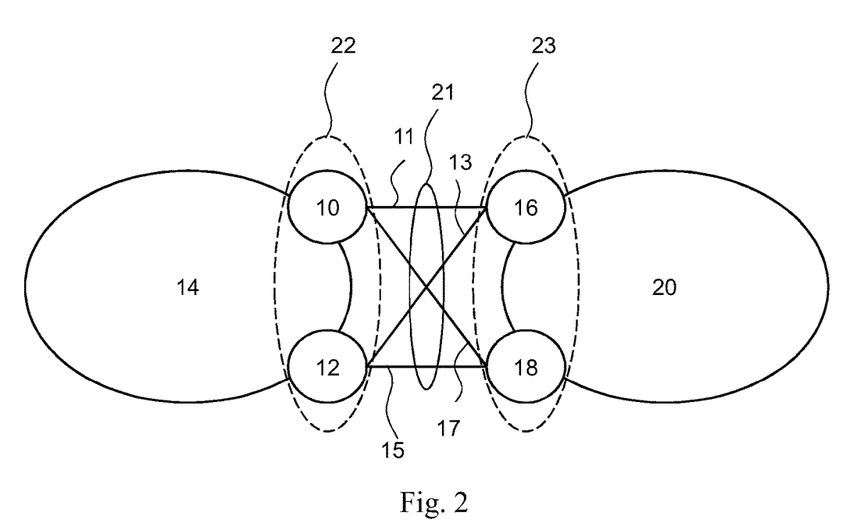
FIG. 2 shows a diagrammatic representation of a 2:2 multi-chassis link aggregation system according to an embodiment.

An example network configuration in which embodiments can be implemented is depicted in FIG. 2. The network has a 2:2 configuration, with nodes 10 and 12 on a first side connected by links 11, 13, 15, 17 to nodes 16 and 18 on a second side. Although illustrated as direct links in FIG. 2, the links are not necessarily direct and can also be, for example, an indirect link or a link which passes through other nodes between its end points. Although no direct connection is depicted between nodes 10 and 12 and between nodes 16 and 18, those nodes can still communicate via their connection to the first network 14 and the second network 20, respectively. In other embodiments a direct connection may be provided between the nodes 10 and 12 and between the nodes 16 and 18. Nodes 10 and 12 are also connected to a first network 14, while nodes 16 and 18 are also connected to a second network 20. The first network 14 and the second network 20 may be, for example, packet switched networks.

In use, the nodes 10, 12, 16, 18 form a link aggregation system and links 11, 13, 15, 17 are operated as a single aggregated group 21 to provide redundancy and failover protection to the connection between the networks 14 and 20. In the embodiments below, the nodes 10, 12 operate as a first group 22 and nodes 16 and 18 operate as a second group 23. However, the links between all four nodes 10, 12, 16 and 18 are configured in the same link aggregation group 21.

Figure 3:
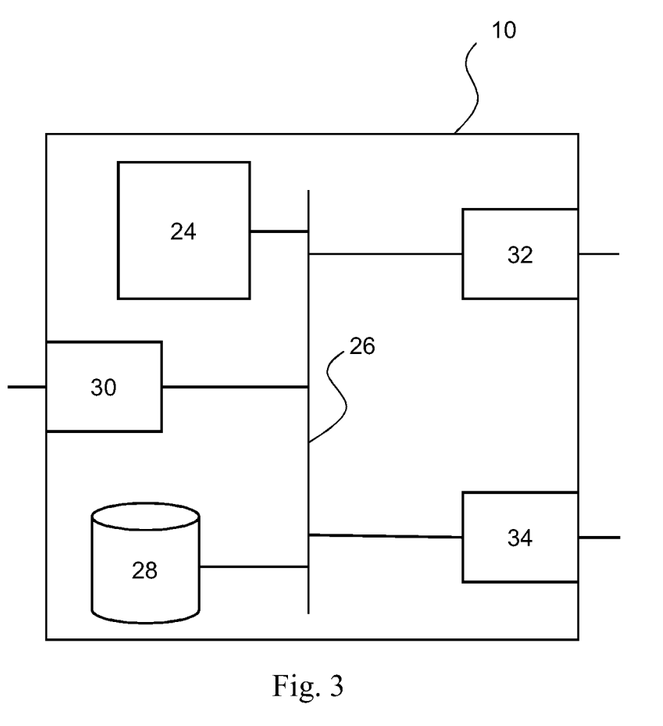
FIG. 3 shows a diagrammatic representation of a network node for use in the network of FIG. 2.

FIG. 3 is a diagrammatic, functional representation of the network node 10. Nodes 12, 16 and 18 can have the same construction as node 10. Node 10 has a processor 24 which is connected by a system bus 26 to memory 28, first network interface 30 (providing network connectivity to the first network and the node 12 via the first network) and two second network interfaces 32, 34 (providing network connectivity to nodes 16, 18 and the second network via the nodes 16, 18). Processor 24 can be any element capable of executing instructions, including (as non-limiting examples) a microprocessor, application processor, system-on-chip, application specific integrated circuit and field programmable gate array. In use, the processor 24 executes instructions stored in the (non-transitory) memory 28 so as to process data received over network interfaces 30, 32, 34. In this embodiment the node 10 is an edge device configured as part of a link aggregation group and the processor is operative to determine whether the node is active or in standby for the link aggregation group. If the node is active, the processor will control which of network interfaces 32 and 34 is active to receive data from, and forward data to, the second network.

As will be discussed in more detail below, the processors of the nodes 10, 12, 16, 18 control the nodes to operate as a single multi-chassis link aggregation system. In general, the group of nodes on each side represents itself as a single logical node to the group of nodes on the other side. Data (or information) is communicated between the two groups on each side using the Link Aggregation Control Protocol, as defined in IEEE 802.1AX-2008, which is incorporated herein by reference for all purposes. In order to represent themselves as a single logical node, the nodes on each side use the control procedures and exchange control messages as defined in the IETF's RFC 7275 (June 2014), which is incorporated herein by reference for all purposes. However, RFC 7275 is applied to the case in which one device is connected to several devices on the other side, for example the 1:2 case in which a customer edge device is dual-homed to a second network via respective links to two provider edge devices. The applicant has found that when the procedures of RFC-7275 are extended to multi-chassis link aggregation groups with at least two devices on both sides not all failure conditions can be detected and recovered from.

Considering the network of FIG. 2, the following types of failure may occur:
 a customer node may fail;
 a provider node may fail;
 a link between the customer and provider nodes may fail;
 a customer node may become isolated from its network; and
 a provider node may become isolated from its network.

When there are multiple nodes on both sides, the procedures as standardized in RFC 7275 do not handle selection of nodes on both sides well. In the 1:N case, a single one of the N nodes is selected as the active node. In the N:M case, one of the N nodes and one of the M nodes must be chosen as the active nodes. Applying RFC 7275 to this situation leaves open failure modes which are not protected. For example, under RFC 7275 nodes 10 and 12 exchange messages using mLACP to select an active node and nodes 16 and 18 use mLACP to select an active node. If both sides select a node independently from each other, they may select respective nodes which have a failed link, or no link, between them. Applying an alternative algorithm where one side selects the active node on the other side may lead to selection of a node on that side that has become isolated from its network.

To address these shortfalls, this embodiment modifies the operation of RFC 7275 in the following general way. The devices on each side are considered as two groups 21 and 23, one on each side of the multi-chassis link aggregation. One group is a master group and selects an active node to use for the link according to standard procedures in RFC 7275. The other group is a slave group; its behavior is first modified to select an active node to use for the link aggregation group by considering connectivity to the active node in the master group. This prevents the situation of two nodes being selected which have no connectivity to each other.

A second modification causes nodes in the slave group to indicate to the nodes in the master group when they have no connectivity to their core network, so that they are not considered when assessing which node to choose as active on the master side. This differs from existing methods in RFC 7275 because it provides a direct indication that connections to that node should not be considered on the master side.

In this embodiment, these modifications to the slave side operation can be achieved using existing fields in LACPDUs (control messages) defined in IEEE 802.1AX-2008 and used by the procedures of LACP defined in IEEE 802.1AX-2008. The same fields defined in IEEE 802.1AX-2008 for LACPDUs are used in control messages under mLACP defined by RFC 7275, so that nodes on the slave side can interoperate with nodes on the master side that are compatible with RFC 7275 but do not implement the extensions of this embodiment. This can provide a lower cost of implementation, or allow the benefits to be obtained when there is no control over the nodes on the other side. (For example a customer may be able to choose their own equipment to connect to a provider, but not what equipment the provider uses.)

Figure 4:
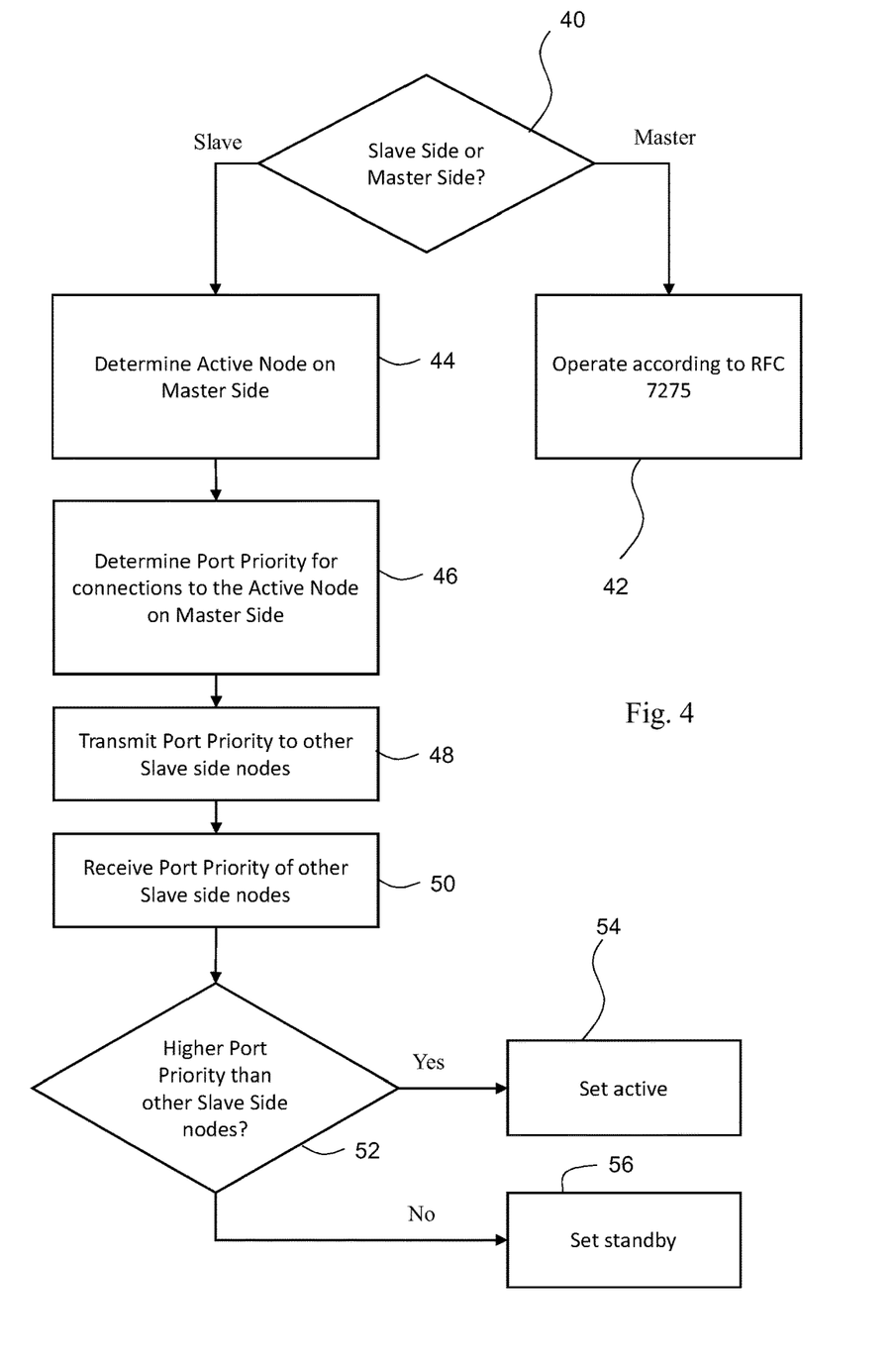
FIG. 4 shows a flow chart of the processing of a network node in a slave group according to an embodiment.

FIG. 4 depicts a flow chart of the modified processing of the first modification, in which a slave group selects an active node by considering connectivity to the active node on the master side. First, at step 40, it is determined whether the network node is on the slave side or the master side. This can be accomplished in a number of ways, for example the role of the node may be pre-programmed as a slave node. When a role is pre-programmed step 40 may be omitted because in that case the procedures by which the node will operate in Link Aggregation with the other nodes will not change. However, in this embodiment, the role of the node is determined by examining the system identifier of LACP messages exchanged by the nodes. The side with the higher system identifier is the master side. (The higher system identifier is the side with the numerically lowest value.) This allows the role of a node to be changed dynamically if required.

If it is determined that the node is on the master side, processing continues to step 42 where the node operates link aggregation according to the procedures defined in RFC 7275. More specifically nodes on the master side exchange mLACP control messages to select an active node. One way of doing this is dynamic port priority modification, where the active node is selected by establishing port priorities indicative of each node's connectivity (both to other nodes in the link aggregation group and to the core network) and the node with the highest port priority is selected.

If it is determined that the node is on the slave side, processing continues to step 44, where the active node on the master side is determined. In one embodiment, the active node on the master side can be determined by examining the Link Aggregation Control Protocol Data Units (LACPDUs) exchanged between nodes on opposite sides operating LACP according to IEEE 802.1AX-2008. The LACPDU contains an "Actor_State" variable which is encoded as 1 octet as specified in IEEE-802.1AX-2008, section 5.4.2.2 item m. (IEEE-802.1AX-2008 is incorporated by reference herein, for all purposes). Within the Actor State variable, bit 3 is encoded as TRUE if a link is considered IN_SYNC or FALSE if a link is considered OUT_OF_SYNC. Only the active node on the master side will have links that are indicated as IN_SYNC. So this can be used to determine the active node on the master side. In normal operation under RFC 7275 a node does not use the value of the Actor_State variable in received LACPDUs to influence selection of the active node. However, in this embodiment the interpretation is modified on the slave side so that only nodes which have one or more links to a node on the master side which are indicated as IN_SYNC are considered for selection as the active node. By this modification the possibility of the master and slave side selecting nodes which have no connectivity is avoided because the selection of the active node on the slave side takes into account the active node on the master side, so it is not making a decision completely independently of the master side.

Next, at step 46, the port priority for links from the node to the active node on the master side is determined. This may also take into account factors in addition to connectivity, such as the current load on the node. At step 48 the calculated port priority is transmitted using mLACP to the other slave side nodes and at step 50 the respective port priority is received using mLACP from the other slave side nodes.

The node can now determine whether it has a higher port priority than the other slave side nodes at step 52. (This is a logical test and does not necessarily mean that it has numerically the highest value).

If it is determined that the node does have the highest port priority then at step 54 the node sets its status to active under RFC 7275. The active node then selects one or more links as SELECTED, according to LACP as defined in IEEE 802.1AX-2008. The combination of this operation on the master and slave sides and the operation of LACP between the two sides results in one or more links between the two active nodes being used to carry traffic.

If it is determined that the node does not have the link with the highest port priority then at step 56 the node sets its status to standby. The node selects all links as STANDBY or UNSELECTED according to LACP as defined in IEEE 802.1AX-2008. These links are not used to carry traffic but are ready to take over if required.

Figure 5:
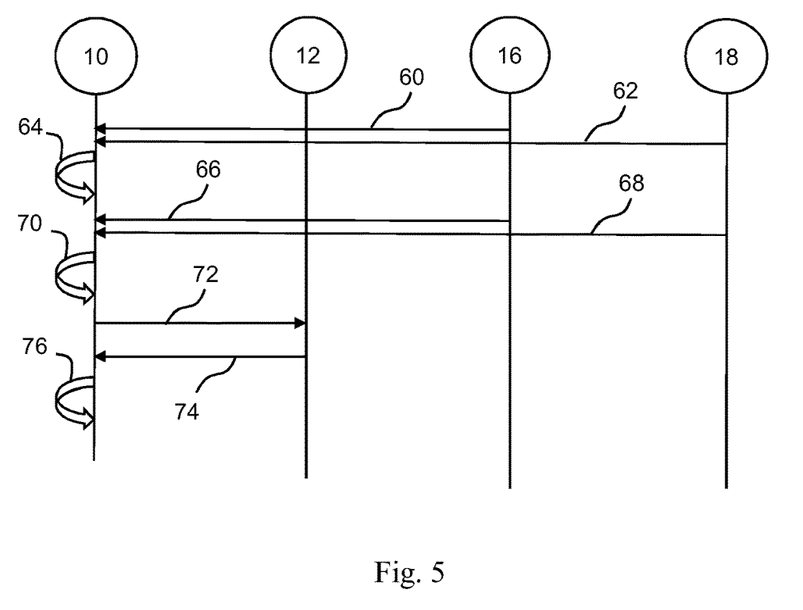
FIG. 5 shows a diagrammatic representation of process flows in FIG. 4.

FIG. 5 depicts an example process flow for the embodiment of FIG. 4. The node 10 initially receives LACP control messages 60 and 62 from nodes 16 and 18. These contain the respective system priority of nodes 16 and 18. Node 10 processes this information at 64, together with knowledge of its own system priority, to determine whether it is part of a slave group or a master group. In this example, the processing at 64 determines that the node is part of a slave group.

Next, the node receives LACP control messages 66 and 68 from nodes 16 and 18 in the other group (which is the master group). It then processes the messages at 70 and examines the Synchronization bit in the Actor State field to determine the active node by looking for links indicated as IN_SYNC on the master side, as discussed above. In some embodiments, the messages 60 and 62 may be examined for the IN_SYNC flag, rather than additional messages 66 and 68 being received. The processing at 70 then determines the port priority of the node for the bundle. This priority is indicative of the connectivity of the node to the active node on the master side. The port priority is then transmitted to the other slave side node 12 at 72 using mLACP according to RFC 7275. At 74 the slave side node 12's port priority for the bundle is received, which is indicative of the connectivity of node 12 to the active master node. At 76, the port priorities are processed to determine whether the node 10 should be active or standby. The role of node 10 is active if it has the highest port priority for the bundle and standby otherwise. If node 10 is active, its links to the active master may be selected for addition to the bundle. If node 10 is standby, then links are programmed as standby links.

Figure 6:
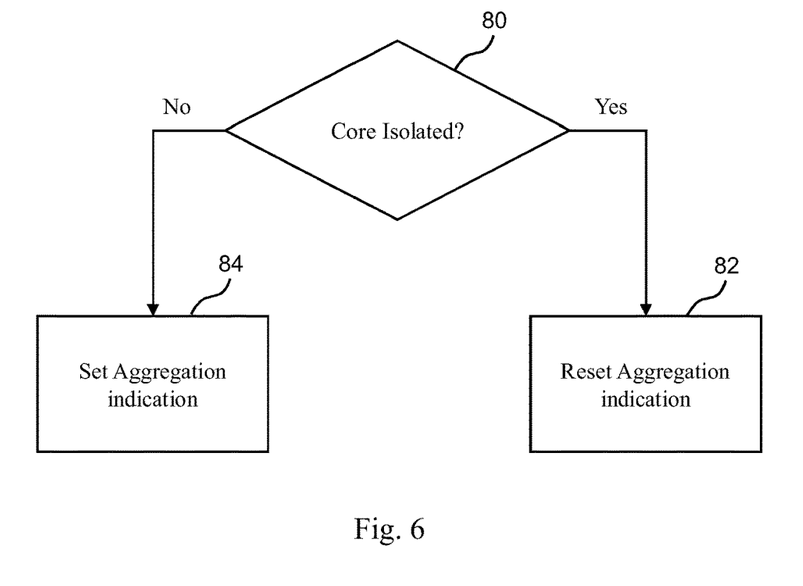
FIG. 6 shows a flow chart of the processing of a network node to indicate core isolation according to another embodiment.

As described so far, the situation of two nodes being selected which have no connectivity has been avoided. FIG. 6 shows a flow chart of additional processing that can allow core isolation to be communicated amongst nodes in the network so that isolated nodes are not considered when selecting active nodes. An isolated node on the slave side may use dynamic port priority modification to dynamically lower its port priority for its links and cause selection of another node on the slave side. However, this will not have any effect on the master side selection of an active node. For example, while the lowering in port priority for an isolated node means an isolated node on the slave side should not be selected on the slave side, the port priority for the link is only considered under mLACP on the slave side and has no influence on the selection of the active node on the master side. For example, the active node on the master side may be selected as a node that only has connectivity to isolated nodes on the slave side, with the result that there is no connectivity between the two networks.

In the embodiment of FIG. 6, when it is determined at 80 that a node is core isolated, an aggregation indication is reset at step 82. On the other hand, when it is determined that the node is not core isolated, the aggregation indication is set at step 84. The aggregation indication is included in control messages sent under LACP between the slave side and the master side. Links are only considered for aggregation if the aggregation indication is set. In this way, an isolated node can influence the decision of the active node on the opposite side.

In an embodiment, the aggregation indication can make use of another bit in the Actor State variable of IEEE-802.1AX-2008, section 5.4.2.2 item m. Aggregation is encoded in bit 2 of the Actor State octet. As defined in IEEE-802.1AX-2008, a TRUE value means the link can be aggregated and a FALSE value means that the link should not be aggregated and is to be considered an individual link. In the embodiment of FIG. 6, the variable is changed dynamically and its meaning is altered to mean that the link should not be considered for aggregation at that time. However, this altered meaning remains consistent with IEEE-802.1AX-2008, allowing this extension to influence nodes which have not been modified according to this embodiment. In this way a device operating according to this embodiment on the slave side can influence nodes following a standard LACP on the master side.

The processing of FIG. 4 and FIG. 6 may be applied together or implemented independently of each other in other embodiments.

To assist understanding, FIGS. 7A to 7E depict the operation of the network of FIG. 2 when using the processes of FIGS. 4 and 6 in the presence of example failures. In FIGS. 7A to 7E only the nodes and the links between them are shown. Active nodes are depicted as a solid circle, inactive (or standby) nodes are depicted as a dashed circle. A link which is carrying traffic between active nodes is depicted as a solid line and a link that isn't carrying traffic is depicted as a dashed line. The system operates to select a link between the active nodes to carry traffic with the other nodes and links providing redundancy to protect against failures.

Figure 7A:
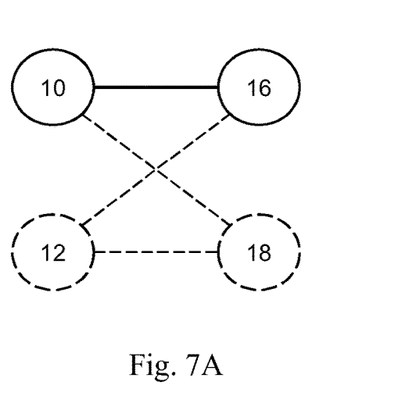
FIGS. 7A to 7E depict an example of the operation of the network of FIG. 2 in the presence of various failures.

The nodes 10 and 12 have a higher system priority than nodes 16 and 18. Therefore nodes 10 and 12 form a master group and nodes 16 and 18 a slave group. Initially, as depicted in FIG. 7A, the absence of any link failures or core-isolation, node 10 is the active device for master group and node 16 is the active device for the slave group. The link that is carrying traffic in the bundle is 10-16.

Figure 7B:
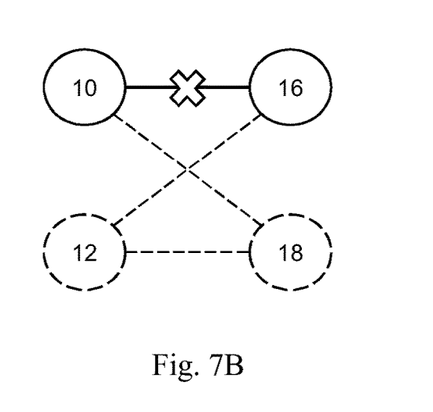

Next, as shown in FIG. 7B, link 10-16 fails. Both node 10 and node 16 have a link that could carry traffic (to node 18 and node 12 respectively), so do not necessarily have any reason to modify their port priorities so that either node 12 or node 18 takes over the active role. However, because node 12 and node 18 are standby, the links 10-18 and 12-16 cannot carry traffic according to conventional processing of RFC-7275. The result is that there is no connectivity.

Figure 7C:
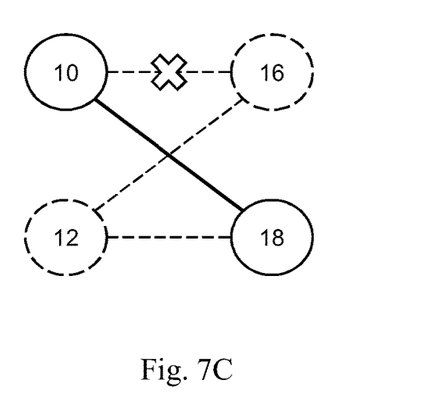

Applying the method of FIG. 4, the difference from conventional processing of RFC-7275 is that node 16 in the slave group now has no links that can carry traffic to the active node 10 on the master side and so uses dynamic port priority modification to lower its port priority (by increasing the numerical value in this case). Dynamic port priority modification is not defined in RFC 7275 and has been proposed to allow the selected node to change as loading conditions and connectivity change, however, it has not been applied to the case where only links to the active node are considered when determining the port priority. Node 18 takes over the active role on the slave side and link 10-18 becomes usable and carries traffic (FIG. 7C).

Figure 7D:
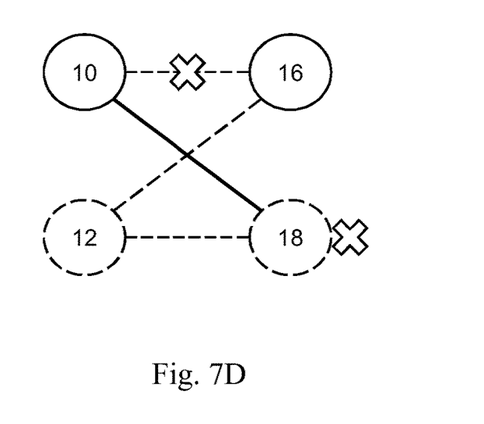

Now suppose at a later time node 18 becomes core-isolated (with link 10-16 still failed). Connectivity to the second network is lost through node 18. This triggers node 18 to lower its port priority using dynamic port priority modification, so that 16 becomes the active slave PE. Now the only link that is potentially usable is 12-16, but with conventional processing of RFC-7275 the master side will not alter its selection and the active node on that side remains node 10. The result is that there is no connectivity (FIG. 7D).

Figure 7E:
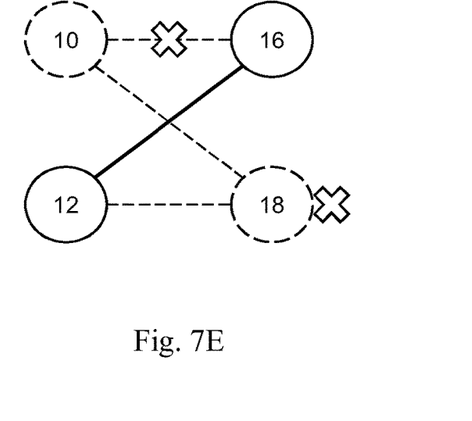

Applying the method of FIG. 6, node 12 can take over as the active master side device from node 10. When node 18 becomes core-isolated, it advertises its links as not aggregatable under LACP. Node 10 now has no usable links and therefore uses dynamic port priority modification to lower its priority. Node 12 has one usable link and so uses its normal priority, which is now higher than that of node 10. Node 12 takes over as active node for the bundle, and the link from 12-16 is used to carry traffic (FIG. 7E).

In embodiments, various entities (for example nodes, devices or other apparatus) are described as comprising a processor or processing system, for example as depicted by processor 24 in FIG. 3. In embodiments, the processing system comprises one or more processors and/or memory. Each device as described in relation to any of the embodiments described above may similarly comprise a processor and/or processing system. One or more of the aspects of the embodiments described herein with reference to the drawings comprise processes performed by devices. In embodiments, a device comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The above embodiments are to be understood as illustrative examples of the invention. Further embodiments of the invention are envisaged. For example, although the embodiments have been described in the context of a 2:2 network, other embodiments can apply to any N:M network where N and M are greater than 2, or to a 1:N network where N is greater than 2. While the above embodiments have discussed network configurations where every node on one side has a single link to every node on the other side, other embodiments may have more than one link between some or all nodes on opposite sides, or no links between some nodes on opposite sides It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of operating a customer edge device configured as part of a link aggregation system, the link aggregation system comprising a plurality of customer edge devices for providing connectivity to a first network, a plurality of provider edge devices for providing connectivity to a second network, and a plurality of links between the customer edge devices and the provider edge devices, wherein the plurality of links are operated as a single aggregated group and the method comprises:

sending link aggregation control messages to other customer edge devices and provider edge devices in the link aggregation system;

receiving link aggregation control messages from the other customer edge devices and the provider edge devices in the link aggregation system;

determining an active provider edge device from the received link aggregation control messages from the provider edge devices using synchronization data contained in one of the received link aggregation control messages from the active provider edge device;

determining a priority of the customer edge device based at least in part on connectivity of the customer edge device to the active provider edge device; and setting the customer edge device in one of an active operation mode and a standby operation mode for the link aggregation system based at least in part on a system priority of the customer edge device and system priorities of the provider edge devices and based at least in part on a comparison of the priority of the customer edge device with one or more received priorities from the received link aggregation control messages from the other customer edge devices, the one or more received priorities based at least in part on connectivity of others of the customer edge devices to the active provider edge device.

2. The method of claim 1, wherein the customer edge device is configured to exchange link aggregation control messages according to IEEE 802.1AX-2008 and the synchronization data is synchronization data in a Link Aggregation Control Protocol Data Unit sent by the active provider edge device.

3. The method of claim 1, wherein the customer edge device is set in the active operation mode when the customer edge device has the highest priority of the customer edge devices.

4. The method of claim 1, further comprising:
determining whether the customer edge device is isolated from the first network; and
responsive to the determination that the customer edge device is isolated from the first network, indicating that the customer edge device is isolated in link aggregation control messages sent by the customer edge device to the provider edge devices.

5. The method of claim 4, wherein the customer edge device is configured to exchange link aggregation control messages according to IEEE 802.1AX-2008 and the indicating that the customer edge device is isolated resets Aggregation data in a Link Aggregation Control Protocol Data Unit sent by the customer edge device to the provider edge devices.

6. The method of claim 4, further comprising:
responsive to a determination that the customer edge device is not isolated from the first network, indicating that the customer edge device is not isolated in link aggregation control messages sent by the customer edge device to the provider edge device.

7. The method of claim 6, further comprising:
changing dynamically the indication that the customer edge device is isolated or is not isolated during operation of the customer edge device.

8. The method of claim 1, further comprising:
determining whether the customer edge device is part of a slave group or a master group; and
the determining the active provider edge device, the determining the priority of the customer edge device, and setting the customer edge device are responsive to the determination that the customer edge device is part of the slave group.

9. The method of claim 8, wherein the determining that the customer edge device is part of the slave group is based at least in part on a system priority of the customer edge device and system priorities of the other customer devices and the provider edge devices.

10. The method of claim 3, further comprising:
determining whether the customer edge device is part of a slave group or a master group; and
the determining the active provider edge device, the determining the priority of the customer edge device, and setting the customer edge device are responsive to the determination that the customer edge device is part of the master group.

11. The method of claim 1, wherein the link aggregation control messages comprise one or more Link Aggregation Control Protocol Data Units as defined in IEEE 802.1AX-2008.

12. A system for use in a customer edge device, the customer edge device for configuration as part of a link aggregation system, the link aggregation system comprising a plurality of customer edge devices for providing connectivity to a first network, a plurality of provider edge devices for providing connectivity to a second network, and a plurality of links between the customer edge devices and the provider edge devices, wherein the plurality of links are operated as a single aggregated group, wherein the system comprises:
a first network interface for connection to the first network; and
at least two second network interfaces for connection to the respective provider edge devices;
at least one memory including computer program code; and
at least one processor in data communication with the at least one memory, wherein the at least one processor is configured to:
send link aggregation control messages to other customer edge devices and the provider edge devices in the link aggregation system;
receive link aggregation control messages from the other customer edge devices and the provider edge devices in the link aggregation system;
determine an active provider edge device from the received link aggregation control messages from the provider edge devices using synchronization data contained in one of the received link aggregation control messages from the active provider edge device;
determine a priority of the customer edge device based at least in part on connectivity of the customer edge device to the active provider edge device; and
set the customer edge device in one of an active operation mode and a standby operation mode for the link aggregation system based at least in part on a system priority of the customer edge device and system priorities of the provider edge devices and based at least in part on a comparison of the priority of the customer edge device with one or more received priorities from the received link aggregation control messages from the other customer edge devices, the one or more received priorities based at least in part on connectivity of others of the customer edge devices to the active provider edge device.

13. The system of claim 12, wherein the at least one processor is configured to cause the customer edge device to exchange link aggregation control messages according to IEEE 802.1AX-2008 and the synchronization data is synchronization data in a Link Aggregation Control Protocol Data Unit sent by the active provider edge device.

14. The system of claim 12, wherein the at least one processor is configured to set the customer edge device in the active operation mode when the customer edge device has the highest priority of the customer edge devices.

15. The system of claim 12, wherein the at least one processor is configured to further cause the customer edge device to:
determine whether the customer edge device is isolated from the first network; and
responsive to the determination that the customer edge device is isolated from the first network, indicate that the customer edge device is isolated in link aggregation control messages sent by the customer edge device to the provider edge devices.

16. The system of claim 15, wherein the at least one processor is configured to further cause the customer edge device to exchange link aggregation control messages according to IEEE 802.1AX-2008; and wherein the indicating that the customer edge device is isolated resets Aggregation data in a Link Aggregation Control Protocol Data Unit sent by the customer edge device to the provider edge devices.

\* \* \* \* \*